United States Patent
Shinozaki

[19]

[11] Patent Number: 6,108,892
[45] Date of Patent: Aug. 29, 2000

[54] SEAL MEMBER AUTOMATIC FITTING APPARATUS AND METHOD

[75] Inventor: Kenichi Shinozaki, Kanagawa, Japan

[73] Assignee: Ricoh Company, Ltd., Tokyo, Japan

[21] Appl. No.: 09/288,849

[22] Filed: Apr. 9, 1999

[30] Foreign Application Priority Data

Apr. 10, 1998 [JP] Japan .................................. 10-116138

[51] Int. Cl.$^7$ ................................................. B23P 19/04
[52] U.S. Cl. .............................. 29/450; 29/235; 294/115; 277/300
[58] Field of Search .................................. 277/312, 300; 29/252, 235, 450, 229; 294/115

[56] References Cited

U.S. PATENT DOCUMENTS

| | | | |
|---|---|---|---|
| 3,191,259 | 6/1965 | Balton | 29/252 |
| 3,494,015 | 2/1970 | Eissele et al. | 29/235 |
| 3,571,895 | 3/1971 | Buttriss | 29/235 |
| 3,581,379 | 6/1971 | Drobilits | 29/235 |
| 3,686,741 | 8/1972 | Williams et al. | |
| 3,858,297 | 1/1975 | Scholin et al. | |
| 4,460,212 | 7/1984 | Montferme | 294/115 |

FOREIGN PATENT DOCUMENTS

501495039  7/1989  Russian Federation .

*Primary Examiner*—S. Thomas Hughes
*Assistant Examiner*—Steven A Blount
*Attorney, Agent, or Firm*—Oblon, Spivak, McClelland, Maier & Neustadt, P.C.

[57] ABSTRACT

A seal member to be fitted on a shaft portion of a rotor is engaged with the front end of a center piece to be fixed on the front end of an automatic machine such as a robot or the like. A slide portion is moved so that the seal member is fixed by a chuck claw. While compressed air is jetted from an air passage of the center piece, the seal member is fitted on the shaft portion. The air passage consists of cylindrical holes and can be easily formed by a hole-forming machine or lathe.

8 Claims, 8 Drawing Sheets

SEAL MEMBER AUTOMATIC FITTING APPARATUS AND METHOD

BACKGROUND OF THE INVENTION

1. Field of the Invention

The present invention relates to a seal member automatic fitting apparatus and method, and more particularly to a seal member automatic fitting apparatus and method in which a seal member is fitted on a shaft portion of a rotor to be mounted in a copy machine, a laser printer or the like, automatically and smoothly, without being damaged.

2. Description of the Related Art

There are various kinds of rotors used in a copy machine, a laser printer, or the like. Such a rotor is equipped with a seal member. The seal member may just be an oil seal, or, for example, may be integrally formed of a shaft seal and a bearing. In the prior art, fitting the seal member on the shaft portion is almost always worked by hand.

Further, fitting the seal member by spraying compressed air on the seal member and using an automatic machine such as robot or the like is also known.

The seal member has a fitting hole formed in both of the shaft seal and bearing for fitting the seal member on the shaft portion, but tolerance of the fitting hole is strict. Hence, even if the seal member is only slightly displaced from the shaft portion, the fitting of the seal member becomes difficult to perform either by the automatic machine such as the robot or the like or by hand. Further, if the fitting of the seal member is performed by force, the seal member may be damaged.

In order to avoid damaging the seal member, a "gutter" may be formed in the shaft portion for fitting the seal member. However, since the compressed air cannot be sprayed so as to produce a balanced pressure on a side of the seal member, the fitting of the seal member cannot be smoothly performed.

As mentioned above, in the case of introducing the compressed air, if the compressed air is not sprayed so as to produce a balanced pressure on the side of the seal member, the fitting of the seal member cannot be smoothly performed. In order to realize a smooth fitting of the seal member, an air passage is need. However, it is typically difficult and expensive to form the air passage.

Figure 8:
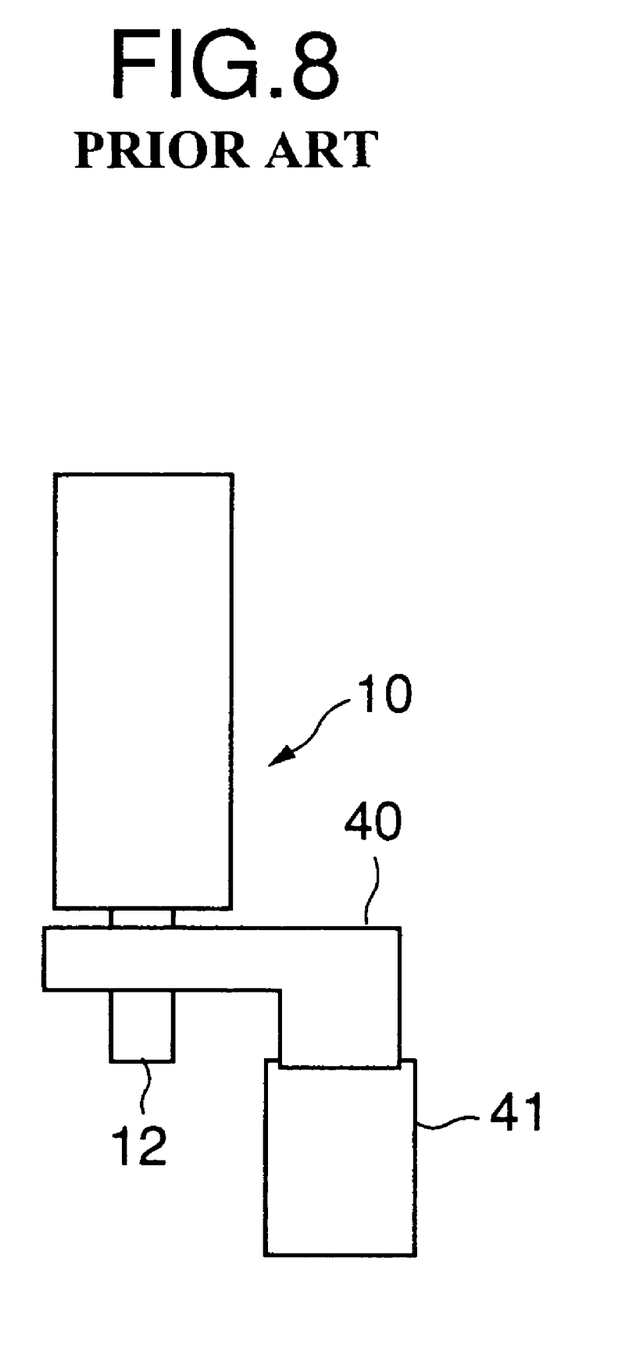
FIG. 8 is a schematic view of a conventional seal member fitting apparatus.

Further, as shown in FIG. 8, in the prior art, an actuator 41, which actuates a chuck claw 40 for a shaft portion 12 of a rotor 10, is disposed in an off-set state so as to prevent interference with the shaft portion 12. For this reason, the fitting of the seal member is difficult, the seal member is easily damaged, and the fitting apparatus cannot be made compact.

SUMMARY OF THE INVENTION

It is a general object of the present invention to provide an apparatus and method for automatically fitting a seal member, in which apparatus and method the above disadvantages are eliminated A more specific object of the present invention is to provide an apparatus and method in which a smooth fitting of a seal member, during which fitting the seal member is not damaged, can be realized automatically and compressed air can be sprayed so as to produce a balanced pressure on a side of the seal member. Further, an air passage should be formed easily and the seal member should be held in a center portion of the fitting apparatus so that the fitting can be performed firmly and compactly.

According to one aspect of this invention, there is provided a seal member automatic fitting apparatus in which a seal member is automatically fitted on a shaft portion of a rotor, the apparatus comprising: a center piece which is axially disposed on a front end of an automatic machine such as a robot or the like, the center piece having an engaging portion formed on a front end thereof for engaging the seal member, a receiving hole formed on a center portion thereof for receiving the shaft portion, and an air passage formed on a periphery of the receiving hole; a slide portion which is movably supported in the center portion, a cylinder chamber being formed between the slide portion and the center portion; a chuck claw which is disposed surrounding the center piece and used for holding the seal member, the chuck claw being linked with the slide portion and being opened and closed according to movement of the slide portion; and a compressed air supplying portion which is used to supply compressed air to the receiving hole of the center piece and the cylinder chamber.

According to the above seal member automatic fitting apparatus, the air passage of the center piece consists of cylindrical holes formed at equal intervals along the periphery of the receiving hole, the cylindrical holes communicating with the receiving hole.

According to the above seal member automatic fitting apparatus, the cylindrical holes are formed in predetermined positions of the receiving hole before the receiving hole is formed, and communicate with the receiving hole after the receiving hole is formed.

The above seal member automatic fitting apparatus may further comprise a spring which is mounted between the center piece and the slide portion and functions to force the slide portion to move in a direction of reducing a volume of the cylinder chamber.

According to another aspect of the present invention there is provided a method for automatically fitting a seal member, the method utilizing a seal member automatic fitting apparatus which comprises a center piece which is axially disposed on a front end of an automatic machine such as a robot or the like, the center piece having an engaging portion formed on a front end thereof for engaging the seal member, a receiving hole formed on a center portion thereof for receiving a shaft portion and an air passage formed on a periphery of the receiving hole; a slide portion which is movably supported in the center portion, a cylinder chamber being formed between the slide portion and the center portion; a chuck claw which is disposed surrounding the center piece and used for holding the seal member, the chuck claw being linked with the slide portion and being opened and closed according to movement of the slide portion; and a compressed air supplying portion which is used to supply compressed air to the receiving hole of the center piece and the cylinder chamber; the method comprising the steps of: (a) opening the chuck claw, inserting the seal member thereinto so that the seal member is engaged with the engaging portion of the front end of the center piece, and then closing the chuck claw; (b) moving the seal member automatic fitting apparatus toward the shaft portion so that the seal member is attached to the shaft portion; (c) connecting the compressed air supplying portion with the receiving hole of the center piece, introducing the compressed air into the air passage while opening the chuck claw, spraying the compressed air on the seal member via the air passage formed around the receiving hole and moving the automatic fitting apparatus forward; and (d) fitting the seal member in a predetermined position of the shaft portion and then retreating the automatic fitting apparatus, while jetting the compressed air toward the seal member.

The seal member, which is integrally formed of a shaft seal and a bearing, is mounted such that the seal member is, in advance, held in the center portion of the apparatus surrounded by the chuck claw and is attached to the front end of the center piece. In this state, the automatic machine such as the robot or the like is moved forward to the shaft portion of the rotor so that the seal member is fitted on the shaft portion.

Since the apparatus of the present invention is a hollow type of apparatus in which the seal member is held in a hollow portion thereof, the seal member can be smoothly fitted on the shaft portion. The compressed air from the compressed air supplying portion is introduced into the air passage via the receiving hole of the center piece. The air passage is formed on the periphery of the receiving hole, consists of the cylindrical holes, and the compressed air therefrom can be sprayed so as to produce a balanced pressure on a side of the seal member. For this reason, the fitting of the seal member can be more smoothly carried out. The chuck claw is properly opened or closed according to the movement of the slide portion moved by the compressed air going in or out of the cylinder chamber. Thus, the seal member can be held or released automatically.

As described above, a smooth fitting of the seal member, during which fitting the seal member is not damaged, can be realized. Further, the air passage can be formed easily without a special processing, and production costs can be reduced.

BRIEF DESCRIPTION OF THE DRAWINGS

Further objects and advantages of the present invention can be more fully understood from the following detailed description taken in conjunction with the accompanying drawings, in which.

DETAILED DESCRIPTION OF THE PREFERRED EMBODIMENTS

Figure 1:
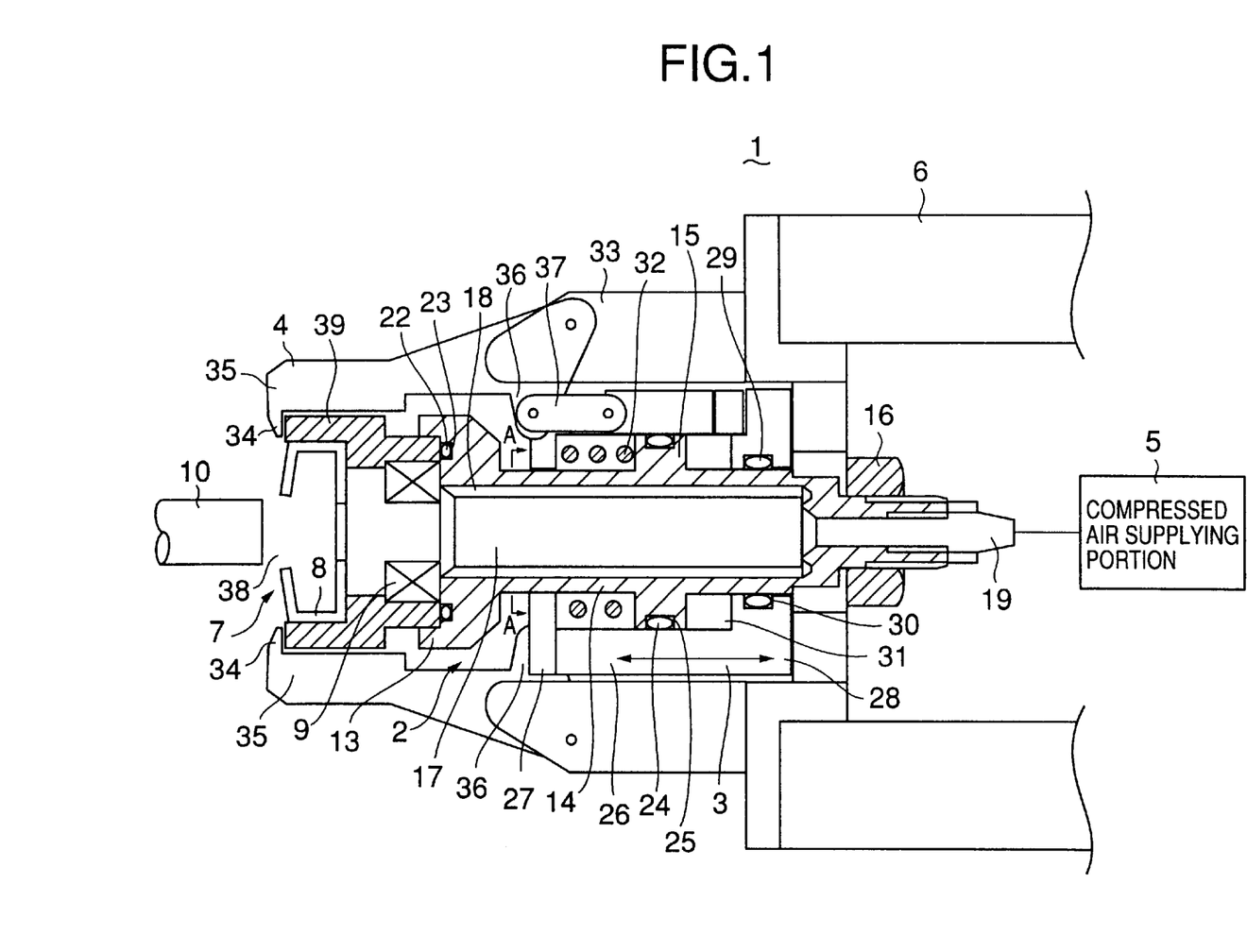
FIG. 1 is an axial cross-sectional view of a seal member automatic fitting apparatus and a seal member held in the apparatus according to the present invention.

FIG. 1 is an axial cross-sectional view of a seal member automatic fitting apparatus and a seal member held in the apparatus.

Figure 5:
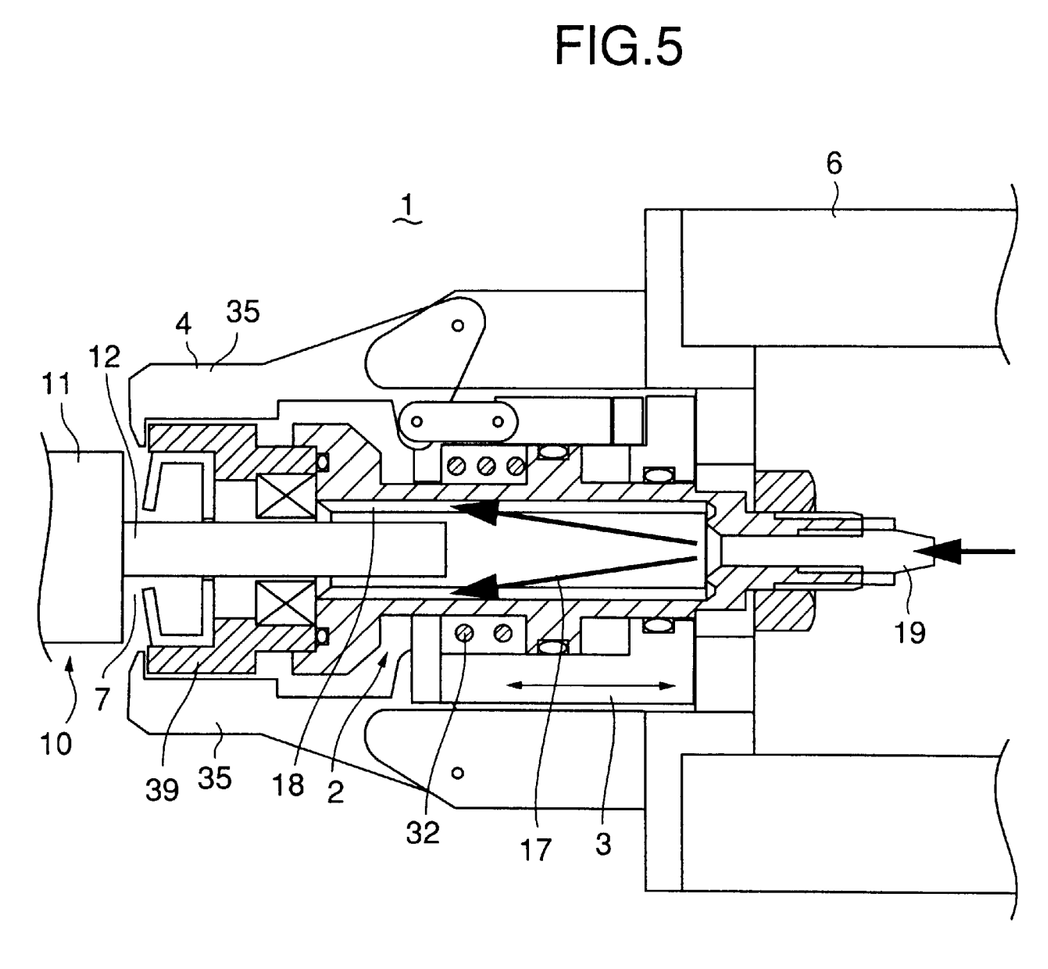
FIG. 5 is an axial cross-sectional view showing a state in which the seal member is moved near the middle of a shaft portion of a rotor.
Figure 6:
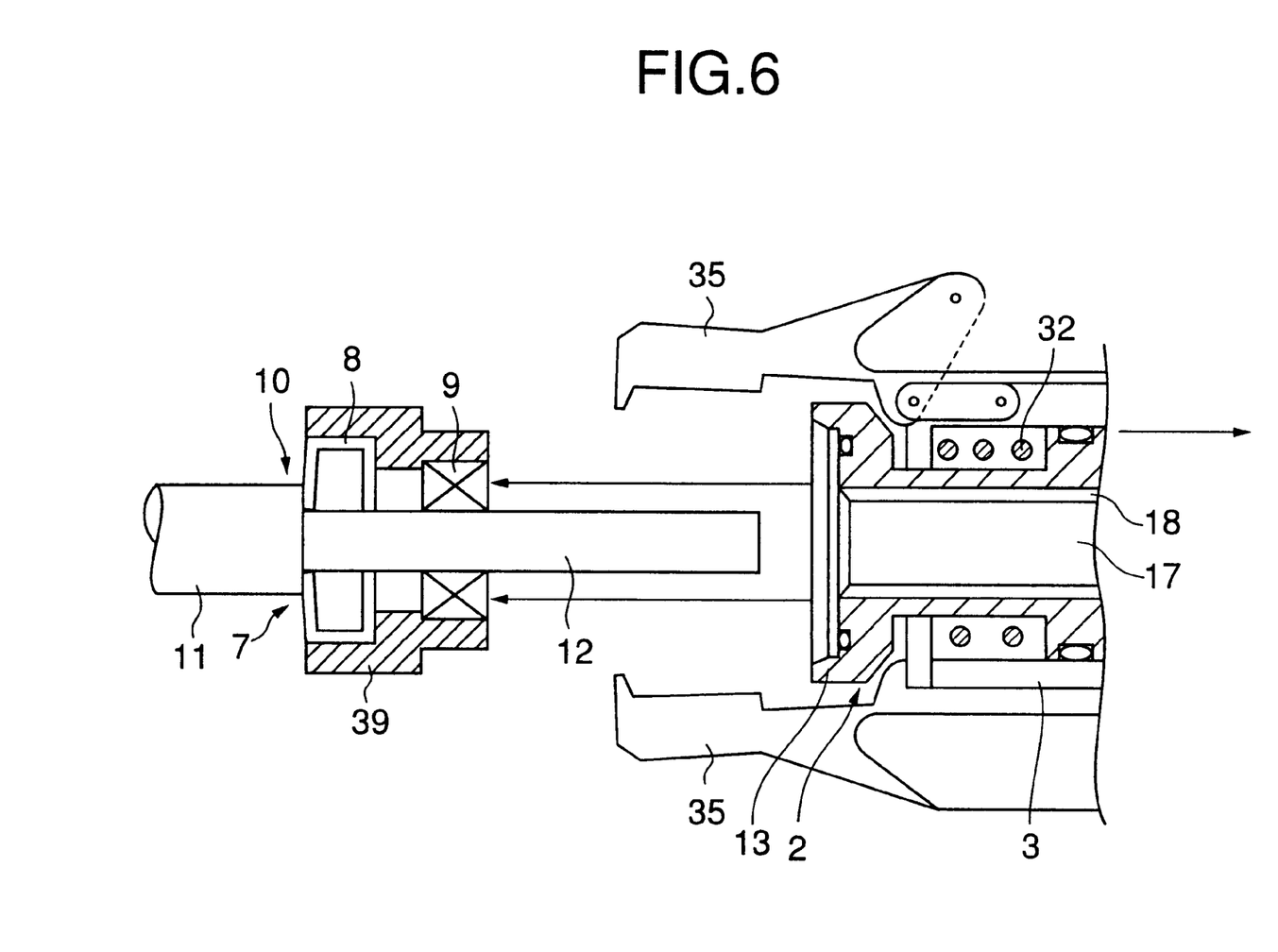
FIG. 6 is a cross-sectional view showing the seal member which has been fitted on the shaft portion of the rotor and showing retreat of the seal member automatic fitting apparatus after the fitting of the seal member.

A seal member automatic fitting apparatus 1 according to the present invention comprises a center piece 2, a slide portion 3, a chuck claw 4, and a compressed air supplying portion 5. The center piece 2 is fixed on the front end of a chuck body 6 of an automatic machine such as a robot or the like. The slide portion 3 is movably supported on the center piece 2. A seal member 7, to be fitted on a rotor 10 by the seal member automatic fitting apparatus 1, is integrally formed of a shaft seal 8 and a bearing 9. The rotor 10 to be combined with the seal member 7, consists of an extended-diameter portion 11 and a shaft portion 12 as shown in FIGS. 5 and 6. The seal member 7 is to be fitted on the shaft portion 12.

The center piece 2 consists of a cylindrical shaft. On the front end of the center piece 2, there are formed an engaging portion 13, a shaft portion 14, and an extended-diameter portion 15. The engaging portion 13 has an extended diameter and functions to engage with the seal member 7. The shaft portion 14 is connected with the engaging portion 13. The extended-diameter portion 15 is formed convexly on the middle portion of the shaft portion 14. The rear end of the shaft body portion 14 is fixed on the chuck body 6 by a nut 16.

Figure 3:
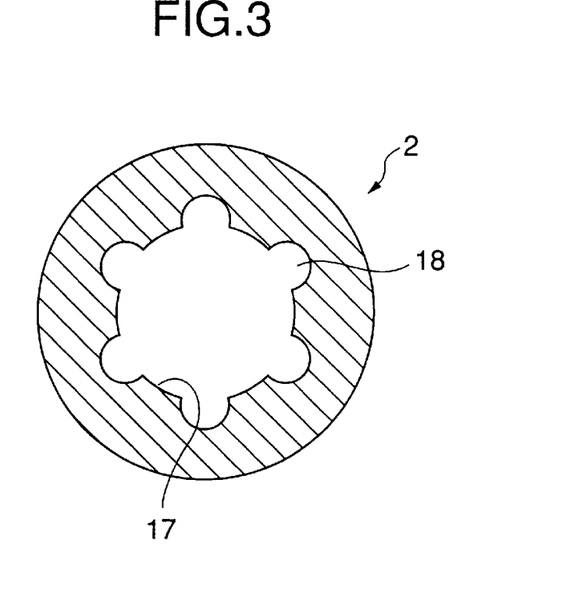
FIG. 3 is an enlarged cross-sectional view taken along a line A—A shown in FIG. 1.

As shown in FIG. 3, in the center of the shaft portion 14, a receiving hole 17 is formed for receiving the shaft portion 12. Along the periphery of the receiving hole 17, an air passage 18 is formed. The air passage 18 communicates with the receiving hole 17.

Figure 2:
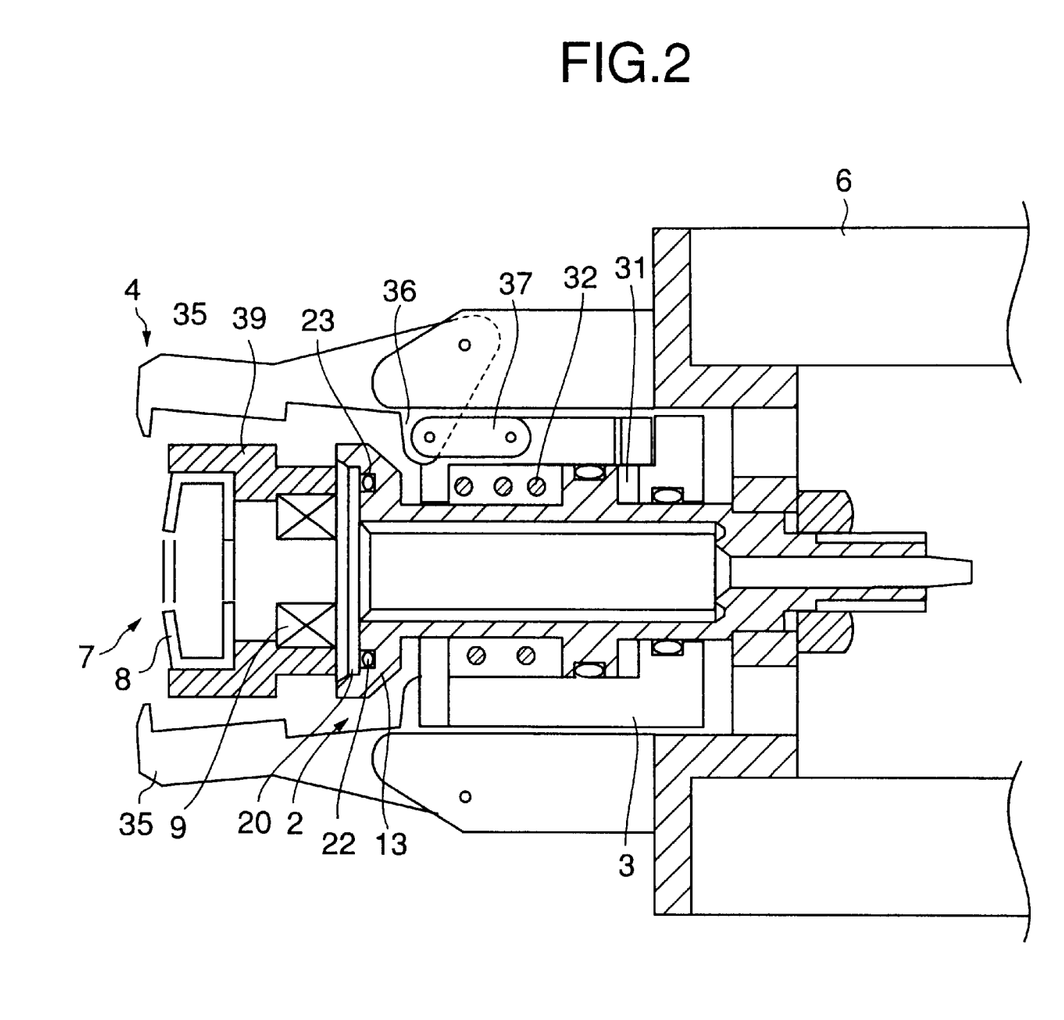
FIG. 2 is an axial cross-sectional view showing a state in which the seal member is held in a center portion of the seal member automatic fitting apparatus according to the present invention.

In the rear end of the shaft portion 14, a compressed air supplying pipe 19, which is connected with the compressed air supplying portion 5, is inserted and fixed. The compressed air supplying pipe 19 is connected with the receiving hole 17. On the front end of the engaging portion 13, a concave guide hole 20 is formed as shown in FIG. 2. On a bottom surface 21 of the guide hole 20, a ring groove 23 is formed for receiving an O-ring 22. On the outer periphery of the extended-diameter portion 15, a concave ring groove 25 is formed for receiving an O-ring 24.

The slide portion 3 consists of a cylinder 26, a front plate portion 27, and a back plate portion 28. The front plate portion 27 and the back plate portion 28 are integrally formed in the front and the rear of the cylinder 26. The cylinder 26 is movably supported on the outer periphery of the extended-diameter portion 15 of the center piece 2. The front plate portion 27 and the back plate portion 28 are movably supported on the shaft portion 14 of the center piece 2.

The back plate portion 28 has an inner hole in which an O-ring 29 and a ring groove 30 for receiving the O-ring 29 are formed.

Between the back plate portion 28 and the extended-diameter portion 15 of the center piece 2, a cylinder chamber 31 is formed and is connected with the compressed air supplying portion 5. Between the front plate portion 27 and the extended-diameter portion 15 of the center piece 2, a spring 32 is mounted.

As shown in FIG. 1, the spring 32 functions to move the slide portion 3 in a direction of reducing the volume of the cylinder chamber 31.

The chuck claw 4 consists of a supporting portion 33 and a claw portion 35. The supporting portion 33 is fixed on one side of the chuck body 6. The claw portion 35 includes a base end portion supported by a pin on the front end side of the supporting portion 33 and a fixing portion 34 for fixing the seal member 7 on the front end of the chuck claw 4. A link member 37 links an arm portion 36 of the base end portion of the claw portion 35 to the slide portion 3.

The compressed air supplying portion 5 functions to force the compressed air in or out of the cylinder portion 31 and the compressed air supplying pipe 19. In this embodiment, when the claw portion 35 of the chuck claw 4 is to be opened to receive the seal member 7, the compressed air is discharged from the cylinder chamber 31; when the seal member 7 is to be fixed by the claw portion 35, the compressed air is introduced into the cylinder chamber 31; and when the seal member 7 is to be fitted on the shaft portion 12 and the apparatus 1 is to be retreated from the shaft portion 12, the compressed air is introduced into the compressed air supplying pipe 19.

The seal member 7, as described above, consists of the shaft seal 8 and the bearing 9. The shaft seal 8 is formed of seal material. As shown in the diagrams, the shaft seal 8 consists of a hollow ring body having a lip portion 38 and is attached to the front end of a seal main body 39. On the other hand, the bearing 9 is mounted on the back end of the seal main body 39. The inner diameters of the shaft seal 8 and the bearing 9 are designed to fit the outer diameter of the shaft portion.

An example will be given of a configuration of the air passage 18 formed in the center piece 2 and a method of forming the air passage 18. As shown in FIG. 3, the air passage 18 consists of cylindrical holes formed at equal intervals along the periphery of the receiving hole 17 in the center portion of the center piece 2. These cylindrical holes communicate with the receiving hole 17. The receiving hole 17 has an inner diameter which is designed such that the shaft portion 12 of the rotor 10 can be received in the receiving hole 17.

Figure 4:
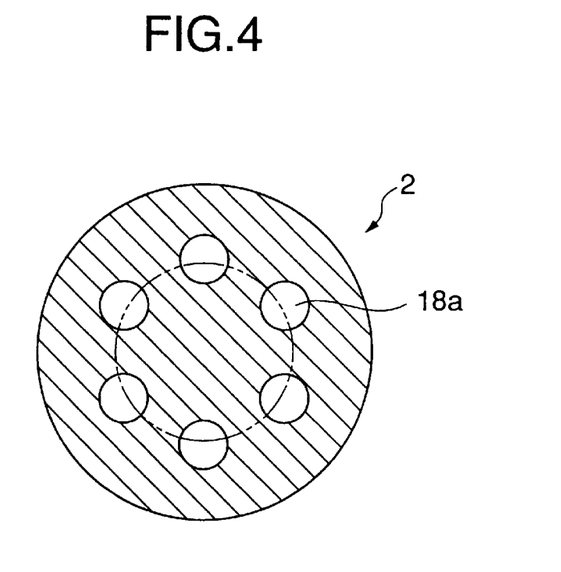
FIG. 4 is a cross-sectional view showing a method of forming an air passage shown in FIG. 3.

The method of forming the air passage 18 having the above-mentioned structure will now be described. As shown in FIG. 4, in the shaft portion 14 of the center piece 2, cylindrical holes 18a are formed in positions corresponding to the air passage 18. After these cylindrical holes 18a are formed along the periphery of the to-be-formed receiving hole 17, the periphery being shown in FIG. 4 by a line formed by alternate long and two short dashes, the receiving hole 17 is formed. Thus, the air passage 18 shown in FIG. 3 can be formed easily. At first glance, expensive processing appears to be needed to form the unusually shaped air passage 18 shown in FIG. 3 or a similar air passage, yet the air passage 18 of the present invention can be formed easily and with high precision by a lathe or a simple hole-forming machine.

Figure 7:
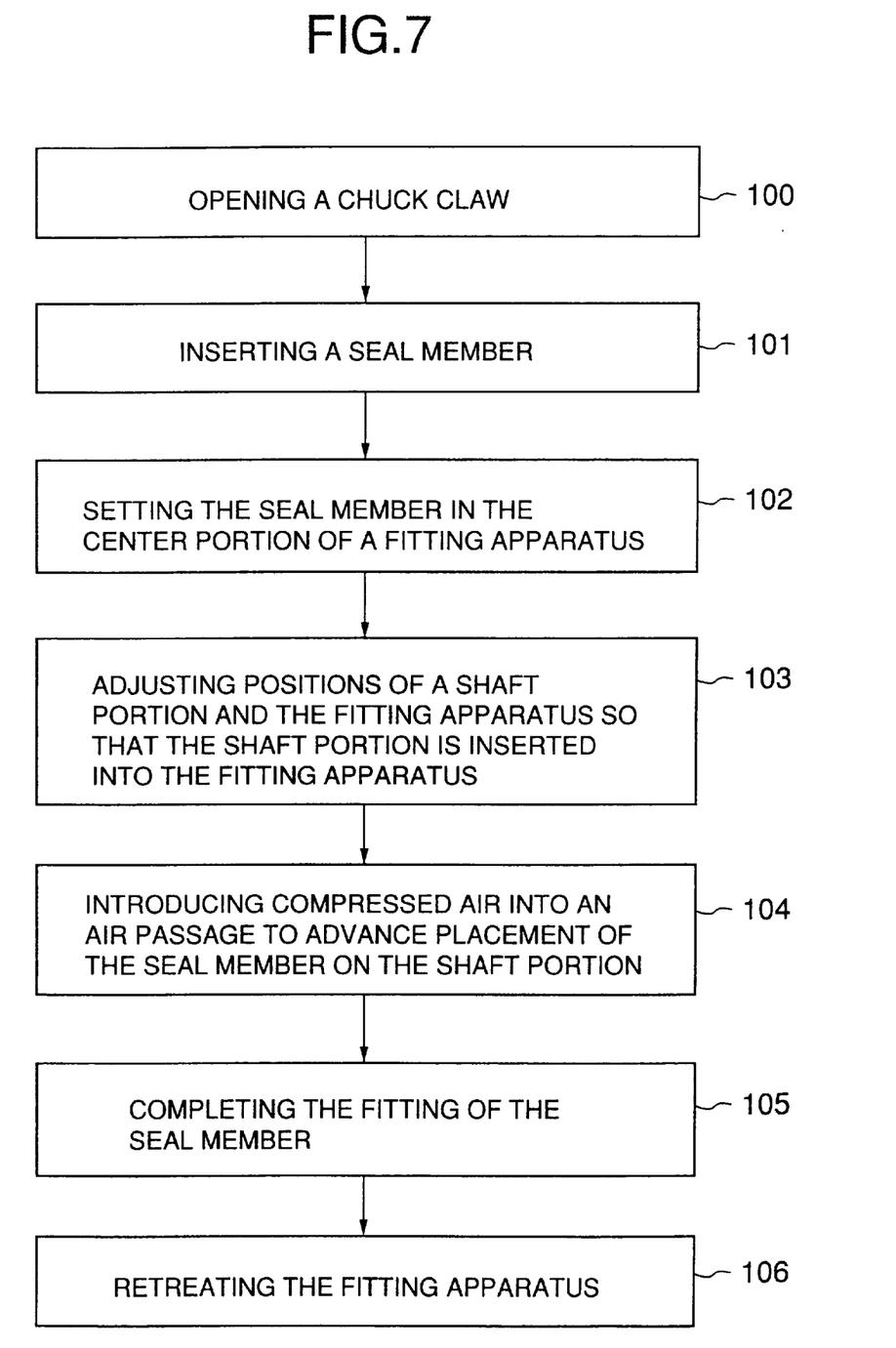
FIG. 7 is a flowchart showing a seal member automatic fitting method according to the present invention.

Next, a description will be given of a method for fitting the seal member 7, the method being performed by the automatic fitting apparatus of the present invention, with reference to FIGS. 1 to 6 and a flowchart of FIG. 7.

As shown in FIG. 2, when the compressed air is discharged from the cylinder chamber 31, the slide portion 3 is moved forward by the spring force of the spring 32, the link member 37 is thereby moved forward, the arm portion 36 which is connected with the link member 37 is rotated, and thus the claw portion 35 is opened (in step 100). After that, since a space portion in a center portion within the claw portion 35 is formed, the seal member 7 is held within the space portion as shown in FIG. 2 (in step 101).

Further, as shown in FIG. 1, the seal member 7 is inserted into the guide hole 20 of the front end of the engaging portion 13 of the center piece 2 and is fixed in the engaging portion 13. At the same time, the compressed air is introduced into the cylinder chamber 31, the chuck claw 35 is closed, and thus the seal member 7 is set in the center portion of the seal member automatic fitting apparatus 1 (in step 102).

Further, the automatic machine such as the robot or the like is actuated, the seal member automatic fitting apparatus 1 in a state shown in FIG. 1 is positioned opposite to the shaft portion 12 of the rotor 10, and then the apparatus 1 is moved forward so that the shaft portion 12 is inserted into the apparatus 1 as shown in FIG. 5 (in step 103). The compressed air from the compressed air supplying portion 5 is introduced into the receiving hole 17 from the compressed air supplying pipe 19 shown in FIG. 1. Hence, as shown in FIG. 5, the compressed air enters the air passage 18, is jetted from the front end of the center piece 2, and hits a rear surface of the seal member 7. The compressed air can be sprayed so as to produce a balanced pressure on the seal member 7 and the seal member 7 can be smoothly placed on the shaft portion 12 (in step 104).

Furthermore, while the compressed air is discharged from the cylinder chamber 31 and the chuck claw 35 is opened, the compressed air from the air passage 18 is jetted toward the seal member 7 and the seal member 7, as shown in FIGS. 5 and 6, is fitted on the shaft portion 12 by moving forward the seal member automatic fitting apparatus 1 (in step 105). When the fitting of the seal member is completed, as shown in FIG. 6, the seal member automatic fitting apparatus 1 is retreated while the air from the air passage 18 is jetted toward the seal member 7 (in step 106). Thus, the automatic fitting of the seal member 7 is completed as described above.

In order to proof effects of the seal member automatic fitting apparatus and method, a test was carried out in which a shaft seal is fitted on a shaft with a diameter of 6 mm. In the test, compressed air is sprayed so as to produce a balanced pressure on the seal member 7 via the air passage 18, and thereby the sail member automatic fitting apparatus 1 is moved forward as above-described method. Then the seal member 7 is fitted in a predetermined position of the shaft portion 12, after that, the seal member 7 is once gradually retreated without opening and closing the chuck claw 4, and the seal member 7 is fitted again in the predetermined position at a high speed. The retreat speed is relatively slow to a speed of the seal member 7 being finally inserted by the shaft portion 12. The details of the test are shown by Table (1) and FIG. 9. In Table (1), factor A denotes air pressure, factor B a retreat stroke (distance) of the seal member 7 being once gradually retreated, factor C the speed ratio of the retreat speed to the insertion speed, and factor D tolerance (diameter of the shaft) which may not be taken into consideration in the test. These factors A, B, C, D are divided into three levels (level 1, 2, 3) respectively.

TABLE (1)

| | Factors | Level 1 | Level 2 | Level 3 |
| --- | --- | --- | --- | --- |
| A | Air pressure | 6 Kgf/cm$^2$ | 3 Kgf/cm$^2$ | none |
| B | Retreat stroke | 0.5 mm | 1 mm | 2 mm |
| C | Speed ratio | 1% | 10% | 20% |
| D | Tolerance | — | — | — |

Figure 9:
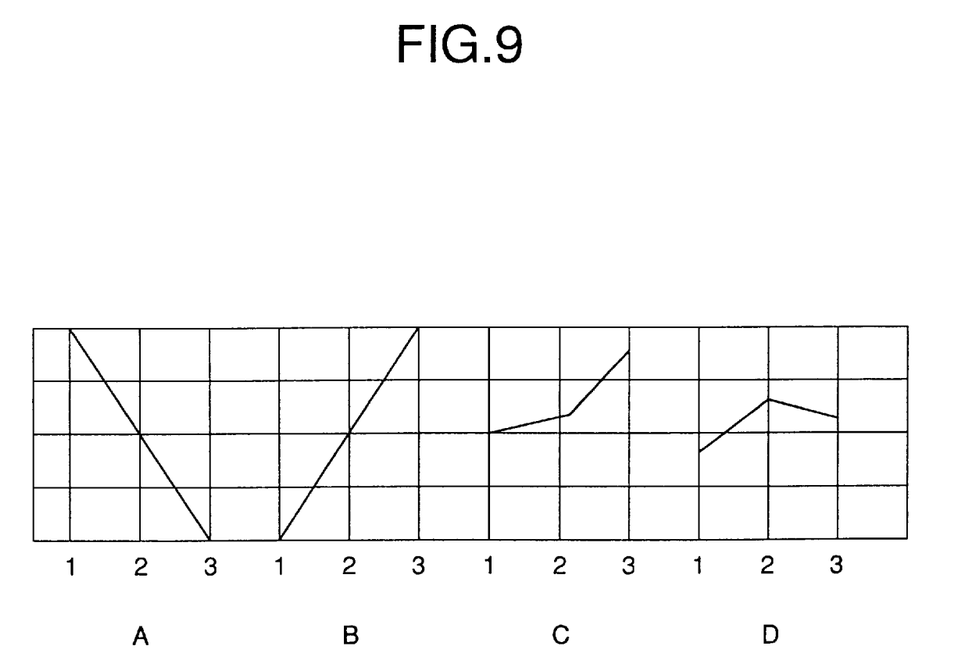
FIG. 9 shows effects of a test of a seal member automatic fitting apparatus and method according to the present invention.

In FIG. 9, effects of the factors of the three levels are shown.

According to the above test results, the effects of the seal member automatic fitting apparatus and method, in which the seal member will not be damaged, can be proofed.

According to one aspect of the seal member automatic fitting apparatus and method of the present invention, the seal member 7 is held in the center portion of the apparatus 1 in which no gutter is formed, and is fitted on the shaft portion 12 by jetting the compressed air from the air passage 8 so as to produce a balanced pressure on the seal member 7. Hence, a smooth fitting of the seal member 7, during which fitting the seal member 7 is not damaged, can be automatically and rapidly performed, even though no gutter is formed between the shaft portion 12 and the apparatus 1. Further, since the seal member 7 is held in the center portion of the apparatus 1, the fitting of the seal member 7 can be carried out in a compact space.

According to another aspect of the seal member automatic fitting apparatus 1 of the present invention, since the air passage 8 of the center piece 2 consists of cylindrical holes formed at equal intervals and has a sufficient ventilation space even if a slight axial displacement occurs in combining the seal member 7 with the rotor 10, sufficient compressed air can be jetted. Hence, a fitting during which the seal member is not damaged can be realized.

According to yet another aspect of the seal member automatic fitting apparatus, the air passage 8 can be simply formed by the hole-opening machine or the lathe and an expensive process is not needed. For this reason, effective production costs can be obtained.

In addition, the present invention is not limited to the above-described embodiments, and variations and modifications may be made without departing from the present invention.

The present application is based on Japanese priority application No. 10-116138 filed on Apr. 10, 1998, the entire contents of which are hereby incorporated by reference.

What is claimed is:

1. A seal member automatic fitting apparatus in which a seal member is automatically fitted on a shaft portion of a rotor, the apparatus comprising:

a center piece which is axially disposed on a front end of an automatic machine, said center piece having an engaging portion formed on a front end thereof for engaging said seal member, a receiving hole formed on a center portion thereof for receiving said shaft portion, and an air passage formed radially on a periphery of said receiving hole;

a slide portion which is movably supported in said center portion, a cylinder chamber being formed between said slide portion and said center portion;

a chuck claw which is disposed surrounding said center piece and used for holding said seal member, said chuck claw being linked with said slide portion and being opened and closed according to movement of said slide portion; and a compressed air supplying portion which is used to supply compressed air to said receiving hole of said center piece and said cylinder chamber.

2. The seal member automatic fitting apparatus as claimed in claim 1, wherein said air passage of said center piece consists of cylindrical holes formed at equal intervals along the periphery of said receiving hole, said cylindrical holes communicating with said receiving hole.

3. The seal member automatic fitting apparatus as claimed in claim 2, wherein said cylindrical holes are formed in predetermined positions of said receiving hole before said receiving hole is formed, and communicate with said receiving hole after said receiving hole is formed.

4. The seal member automatic fitting apparatus as claimed in claim 1, further comprising a spring which is mounted between said center piece and said slide portion and functions to force said slide portion to move in a direction of reducing a volume of said cylinder chamber.

5. The seal member automatic fitting apparatus as claimed in claim 4 wherein the automatic machine is a robot.

6. A seal member automatic fitting method, utilizing a seal member automatic fitting apparatus which comprises a center piece which is axially disposed on a front end of an automatic machine, said center piece having an engaging portion formed on a front end thereof for engaging said seal member, a receiving hole formed on a center portion thereof for receiving said shaft portion, and an air passage formed radially on a periphery of said receiving hole; a slide portion which is movably supported in said center portion, a cylinder chamber being formed between said slide portion and said center portion; a chuck claw which is disposed surrounding said center piece and used for holding said seal member, said chuck claw being linked with said slide portion and being opened and closed according to movement of said slide portion; and a compressed air supplying portion which is used to supply compressed air to said receiving hole of said center piece and said cylinder chamber; said method comprising the steps of:

(a) opening said chuck claw, inserting said seal member thereinto so that said seal member is engaged with said engaging portion of the front end of said center piece, and then closing said chuck claw;

(b) moving said seal member automatic fitting apparatus toward said shaft portion so that said seal member is attached to said shaft portion;

(c) thereafter, connecting said compressed air supplying portion with said receiving hole of said center piece, introducing the compressed air into said air passage while opening said chuck claw, spraying the compressed air on said seal member via said air passage formed around said receiving hole and moving forward said automatic fitting apparatus; and (d) fitting said seal member in a predetermined position of said shaft portion and then retreating said automatic fitting apparatus, while jetting the compressed air toward said seal member.

7. A seal member automatic fitting method according to claim 6, wherein step c comprises spraying said compressed air on said seal member via said air passage and then moving forward said seal member automatic fitting apparatus, as claimed in claim 6, and wherein step (d) further comprises fitting said seal member in a predetermined position of said shaft portion, thereafter once gradually retreating said seal member without opening and closing said chuck claw, and then fitting said seal member again in said predetermined position at a high speed.

8. The seal member automatic fitting method as claimed in claim 6 wherein the automatic machine is a robot.

* * * * *